United States Patent
Sato et al.

(10) Patent No.: US 11,053,399 B2
(45) Date of Patent: Jul. 6, 2021

(54) PHOTOCURABLE INKJET PRINTING INK COMPOSITION

(71) Applicant: SAKATA INX CORPORATION, Osaka (JP)

(72) Inventors: Yoichi Sato, Osaka (JP); Okinori Nakashima, Osaka (JP); Takuya Myose, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 16/629,949

(22) PCT Filed: Jul. 3, 2018

(86) PCT No.: PCT/JP2018/025225
§ 371 (c)(1),
(2) Date: Jan. 9, 2020

(87) PCT Pub. No.: WO2019/013047
PCT Pub. Date: Jan. 17, 2019

(65) Prior Publication Data
US 2020/0148903 A1  May 14, 2020

(30) Foreign Application Priority Data
Jul. 14, 2017 (JP) .............................. JP2017-138275

(51) Int. Cl.
| | |
|---|---|
| *C08F 2/46* | (2006.01) |
| *C08F 2/50* | (2006.01) |
| *C08G 61/04* | (2006.01) |
| *C09D 11/101* | (2014.01) |
| *C08K 3/013* | (2018.01) |
| *B41M 1/28* | (2006.01) |
| *C08F 20/18* | (2006.01) |
| *C08F 20/34* | (2006.01) |
| *C08F 20/58* | (2006.01) |
| *C08K 3/22* | (2006.01) |
| *C08K 5/5397* | (2006.01) |
| *C09D 11/322* | (2014.01) |

(52) U.S. Cl.
CPC ............ *C09D 11/101* (2013.01); *B41M 1/28* (2013.01); *C08F 20/18* (2013.01); *C08F 20/34* (2013.01); *C08F 20/58* (2013.01); *C08K 3/013* (2018.01); *C08K 3/22* (2013.01); *C08K 5/5397* (2013.01); *C09D 11/322* (2013.01); *C08K 2003/2227* (2013.01)

(58) Field of Classification Search
CPC .. B41M 5/00; B41M 1/28; B41M 2/01; C08F 20/18; C08F 20/34; C08F 20/58; C09D 11/01; C08K 3/013; C08K 3/22; C08K 5/5397; C08K 2003/2227; B41J 2/01
USPC .................................................. 522/1; 520/1
See application file for complete search history.

(56) References Cited

U.S. PATENT DOCUMENTS

| | | | |
|---|---|---|---|
| 2009/0053484 A1 | 2/2009 | Yoshihiro et al. | |
| 2009/0171007 A1* | 7/2009 | Jonai .................... | C09D 11/101 524/548 |
| 2017/0260405 A1* | 9/2017 | Kumai ................. | C09D 11/101 |

FOREIGN PATENT DOCUMENTS

| | | | |
|---|---|---|---|
| EP | 2644634 A1 | | 10/2013 |
| JP | 2006016507 A | | 1/2006 |
| JP | 2006016508 A | | 1/2006 |
| JP | 2006328227 | * | 12/2006 |
| JP | 2006328227 A | | 12/2006 |
| JP | 2007056232 A | | 3/2007 |
| JP | 2007131755 A | | 5/2007 |
| JP | 2007169462 A | | 7/2007 |
| JP | 2008045145 A | | 2/2008 |
| JP | 2009235272 A | | 10/2009 |
| JP | 2010111716 | * | 5/2010 |
| JP | 2010138332 A | | 6/2010 |
| JP | 2010229378 A | | 10/2010 |
| JP | 2010265430 A | | 11/2010 |
| JP | 2012162615 A | | 8/2012 |
| JP | 2012162616 A | | 8/2012 |
| JP | 2013023563 A | | 2/2013 |
| JP | 2013189532 A | | 9/2013 |
| JP | 2014133864 A | | 7/2014 |
| JP | 2014224233 A | | 12/2014 |
| JP | 2016199688 A | | 12/2016 |
| JP | 2016210951 A | | 12/2016 |
| JP | 2016215621 A | | 12/2016 |

(Continued)

OTHER PUBLICATIONS

Kawakami, JP 2006328227 Machine Translation, Dec. 7, 2006 (Year: 2006).*
Itami et al, JP 2010-111716 Machine translation, May 20, 2010 (Year: 2010).*
Kagose etal, JP 2017-088888 Machine Translation, May 25, 2017 (Year: 2017).*
International Search Report (ISR) dated Aug. 14, 2018, issued for International application No. PCT/JP2018/025225. (3 pages).

(Continued)

*Primary Examiner* — Jessica Whiteley
(74) *Attorney, Agent, or Firm* — Law Office of Katsuhiro Arai

(57) ABSTRACT

An object is to provide an ink composition for inkjet printing that permits inkjet printing, particularly on metal surfaces, wherein such ink composition possesses sufficiently high adhesion and heat resistance with respect to metal surfaces. As a means for achieving the object, a photocurable inkjet printing ink composition is provided, which contains, relative to the entire ink composition, 0.1 percent by mass or more of an acid-modified acrylic monomer and 10 to 30 percent by mass of a monofunctional monomer with a Tg of 100° C. or above, wherein the monofunctional monomer accounts for 80 percent by mass or more of all monomers.

2 Claims, No Drawings

(56) References Cited

FOREIGN PATENT DOCUMENTS

| JP | 2017088830 A | | 5/2017 |
|----|--------------|---|--------|
| JP | 2017088888 | * | 5/2017 |
| JP | 2017088888 A | | 5/2017 |
| JP | 6520717 B2 | | 5/2019 |
| WO | 2007013368 A1 | | 2/2007 |
| WO | 2007094446 A1 | | 8/2007 |
| WO | 2015080155 A1 | | 6/2015 |

OTHER PUBLICATIONS

Notification Concerning Transmittal of International Preliminary Report on Patentability (PCT/IB/326) and Notification of Transmittal of Translation of the International Preliminary Report on Patentability (PCT/IB/338) dated Jan. 23, 2020, with International Preliminary Report on Patentability (PCT/IB/373) and Written Opinion of the International Searching Authority (PCT/ISA/237), for corresponding international application PCT/JP2018/025225 (16 pages).

Extended European Search Report (EESR) dated Mar. 17, 2021, issued for European counterpart patent application No. EP18831680.6 (7 pages).

* cited by examiner

PHOTOCURABLE INKJET PRINTING INK COMPOSITION

CROSS-REFERENCE TO RELATED APPLICATIONS

This application is the U.S. National Phase under 35 U.S.C. § 371 of International Application PCT/JP2018/025225, filed Jul. 3, 2018, which claims priority to Japanese Patent Application No. JP2017-138275, filed Jul. 14, 2017. The International Application was published under PCT Article 21(2) in a language other than English.

TECHNICAL FIELD

The present invention relates to a photocurable inkjet printing ink composition for metals.

BACKGROUND ART

UV-curable inkjet offset inks containing acid-modified acrylic monomers are known, as described in Patent Literatures 1 and 2.

However, these inks containing acid-modified acrylic monomers, although they may be non-problematic when used as offset printing inks for printing on papers, do not have sufficient adhesion or heat resistance with respect to the surfaces of printing objects when the printing objects are made of metals such as metal sheets.

BACKGROUND ART LITERATURE

Patent Literature

Patent Literature 1: Japanese Patent Laid-open No. 2006-016507
Patent Literature 2: Japanese Patent Laid-open No. 2006-016508

SUMMARY OF THE INVENTION

Problems to be Solved by the Invention

In light of the above, an object of the present invention is to provide an ink composition for inkjet printing that permits inkjet printing, particularly on metal surfaces, wherein such ink composition possesses sufficiently high adhesion and heat resistance with respect to metal surfaces.

Means for Solving the Problems

The inventors studied in earnest to achieve the aforementioned object, and consequently completed the present invention as a photocurable inkjet printing ink composition containing an acid-modified acrylic monomer and a monofunctional monomer whose Tg (glass transition temperature) is 100° C. or above.

To be specific, the present invention is as follows:
1. A photocurable inkjet printing ink composition, containing, relative to the entire ink composition:
    0.1 percent by mass or more of an acid-modified acrylic monomer; and
    10 to 30 percent by mass of a monofunctional monomer with a Tg of 100° C. or above; wherein the monofunctional monomer accounts for 80 percent by mass or more of all monomers.
2. A photocurable inkjet printing ink composition according to 1, wherein the monofunctional monomer with a Tg of 100° C. or above is a monofunctional monomer with a Tg of 120° C. or above.

Effects of the Invention

The present invention is such that it can demonstrate the significant effects of having sufficiently high adhesion and heat resistance, particularly with respect to metal surfaces.

MODE FOR CARRYING OUT THE INVENTION

The photocurable inkjet printing ink composition proposed by the present invention (hereinafter also referred to as "ink composition proposed by the present invention") is explained in detail below.

<Acid-Modified Acrylic Monomer>

The acid-modified acrylic monomer under the present invention is, for example, a monomer component obtained from the ester reaction of a polyol with a (meth)acrylic acid and/or (meth)acrylic acid multimer, as well with a phosphoric acid, fatty acid of C3-20, or condensation product formed by the condensation of a fatty acid of C3-20 and one or more types of (meth)acrylic acid, wherein this monomer is such that, when this acid-modified acrylic monomer is made into a homopolymer, its acid value will be 100 mgKOH/g or greater.

To be specific, an acid-modified acrylic monomer whose structure is such that some hydroxyl groups of a polyol are ester-bonded with a (meth)acrylic acid, while other hydroxyl groups are ester-bonded with a phosphoric acid, is preferred.

Under the present invention, an acid-modified acrylic monomer is contained by 0.1 percent by mass or more, or preferably by 0.3 to 3.0 percent by mass, or more preferably 0.4 to 1.5 percent by mass, in the photocurable inkjet printing ink composition. If the content is less than 0.1 percent by mass, the adhesion to aluminum will become poor and so will the filtration property of the ink composition immediately after its manufacture and after a long period of storage.

<Monofunctional Monomer with a Tg of 100° C. or Above>

The monofunctional monomer with a Tg of 100° C. or above under the present invention is, for example, acryloyl morpholine (ACMO) (145° C.), N-vinyl caprolactam (VCAP) (125° C.), methyl methacrylate (105° C.), acrylamide (165° C.), acrylic acid (106° C.), dicyclopentanyl methacrylate (175° C.), dicyclopentanyl acrylate (120° C.), isobornyl methacrylate (173° C.), or 1-adamantyl methacrylate (153° C.). Of the foregoing, those with a Tg of 120° C. or above are preferred.

It should be noted that "a monofunctional monomer with a Tg of 100° C. or above" indicates that, when this monofunctional monomer is made into a homopolymer, its Tg will be 100° C. or above.

The content of such monofunctional monomer is 10 to 30 percent by mass, or preferably 15 to 25 percent by mass, relative to the entire ink composition. If the content is less than 10 percent by mass, heat resistance of the coating film will deteriorate; if the content exceeds 30 percent by mass, on the other hand, adhesion to aluminum will become poor.

<Monofunctional Monomer>

The monofunctional monomer under the present invention is, in addition to the aforementioned monofunctional monomers with a Tg of 100° C. or above, ethyl carbitol acrylate, ethyl acrylate, butyl acrylate, 2-ethylhexyl acrylate, acrylonitrile, methyl styrene, cyclohexyl methacrylate, vinyl acetate, n-propyl methacrylate, n-butyl methacrylate, methyl acrylate, vinyl acetate, n-propyl methacrylate, n-butyl methacrylate, methyl acrylate, 2-hydroxy-3-phenoxypropyl acrylate, 2-(dimethylamino)ethyl (meth)arcylate, 3-(dimethylamino)propyl (meth)arcylate, N-[3-(dimethylamino)propyl] acrylamide, or N-[3-(dimethylamino)propyl] methacrylamide, for example.

The monofunctional monomer content in the ink composition proposed by the present invention is 80 percent by mass or more, or preferably 85 percent by mass or more, of all monomers.

<Extender Pigment>

Under the present invention, an extender pigment may be blended in. Such extender pigment may be silica, aluminum oxide, or calcium carbonate.

When this extender pigment is blended in, the extender pigment content in the ink composition is 0.1 percent by mass or more, or preferably 0.5 to 7.0 percent by mass, or more preferably 0.7 to 5.0 percent by mass.

<Multifunctional Monomer and Photopolymerizable Oligomer>

Under the present invention, the below-mentioned multifunctional monomers and photopolymerizable oligomers and polymers may also be used, to the extent that doing so does not impair the effects of the present invention.

For these other photopolymerizable components, use of monomers, prepolymers, oligomers, etc., is allowed without any particular limitation so long as they are compounds that contain ethylenic double bonds.

Examples of such photopolymerizable components include: amino-modified acrylic oligomer, vinyloxyethoxyethyl (meth)acrylate, ethylene glycol di(meth)acrylate, diethylene glycol di(meth)acrylate, triethylene glycol di(meth)acrylate, polyethylene glycol di(meth)acrylate, propane diol di(meth)arcylate, butane diol di(meth)acrylate, 1,6-hexane diol diacrylate (HDDA), dipropylene glycol di(meth)acrylate, tripropylene glycol di(meth)acrylate, and other (poly)alkylene glycol di(meth)acrylates; trimethylol propane tri(meth)acrylate and ethylene oxide-modified product thereof; pentaerythritol tetra(meth)acrylate and ethylene oxide-modified product thereof; dipentaerythritol penta(meth)acrylate and ethylene oxide-modified product thereof; dipentaerythritol hexa(meth)acrylate and ethylene oxide-modified product thereof; urethane (meth)acrylate, epoxy (meth)acrylate, polyester (meth)acrylate, and other photopolymerizable components; as well as amino group-containing multifunctional monomers including CN371, CN550, and CN551 manufactured by Sartomer, AgiSyn001, AgiSyn002, AgiSyn003, AgiSyn005, AgiSyn006, AgiSyn007, and AgiSyn008 manufactured by DSM-Agi, and EBECRYL80 and EBECRYL7100 manufactured by Daicel-Allnex (all are product names). Of these, any one type may be used alone, or two or more types may be combined as necessary.

Among these, blending of an amino-modified acrylic oligomer is desirable.

<Non-Polymerizable Resin>

Furthermore, an amine-modified acrylate oligomer (product name: CN371NS, manufactured by Sartomer) and other aromatic ketone-formaldehyde condensation-type hydrogenated ketone resins may also be used as non-polymerizable resins. Any one type of the aforementioned other photopolymerizable components and non-polymerizable resins may be used alone, or two or more types may be combined as necessary.

<Photopolymerization Initiator>

The photocurable inkjet printing ink composition proposed by the present invention contains a photopolymerization initiator.

For the photopolymerization initiator, an acylphosphine oxide photopolymerization initiator (compound) or thioxanthone photopolymerization initiator (compound) whose initiator function manifests under light with a wavelength of 300 to 450 nm, is preferred. It should be noted that " . . . whose initiator function manifests under light with a wavelength of 300 to 450 nm" above indicates possession of light-absorbing properties over the entire wavelength region of 300 to 450 nm. By using such acylphosphine oxide photopolymerization initiator or thioxanthone photopolymerization initiator, curability under LED light can be added further to the photocurable inkjet printing ink composition proposed by the present invention.

Specific examples of acylphosphine oxide photopolymerization initiators include 2,4,6-trimethyl benzoyl-diphenyl-phosphine oxide (product name: TPO, manufactured by Lamb son), bis(2,4,6-trimethyl benzoyl)-phenyl-phosphine oxide (product name: IRGACURE819, manufactured by BASF), and the like.

Also, specific examples of thioxanthone photopolymerization initiators include 2,4-diethyl thioxanthone (DETX), 2-isopropyl thioxanthone, 4-isopropyl thioxanthone, and the like.

The content of any such acylphosphine oxide photopolymerization initiator or thioxanthone photopolymerization initiator is preferably in a range of 3 to 25 percent by mass, or more preferably in a range of 5 to 15 percent by mass, relative to the total mass of photopolymerizable components. If the content of acylphosphine oxide photopolymerization initiator or thioxanthone photopolymerization initiator is less than 3 percent by mass, sufficient curability may not be achieved. If the content exceeds 25 percent by mass, on the other hand, storage stability of the photocurable inkjet printing ink composition proposed by the present invention will drop.

<Sensitizer>

The photocurable inkjet printing ink composition proposed by the present invention may further use, for the purpose of promoting its curability under ultraviolet light, a photosensitizer (compound) which has light-absorbing properties primarily in a UV wavelength region of 400 nm or longer and whose sensitization function manifests under light with a wavelength in this range.

It should be noted that " . . . whose sensitization function manifests under light with a wavelength in this region [of 400 nm or longer]" above indicates possession of light-absorbing properties in a wavelength region of 400 nm or longer. By using such sensitizer, the LED curability of the photocurable inkjet printing ink composition proposed by the present invention can be promoted.

The aforementioned photosensitizer may be an anthracene sensitizer, thioxanthone sensitizer, etc., but preferably it is a thioxanthone sensitizer. Any of the foregoing may be used alone, or two or more types may be combined.

Specific examples include: 9,10-dibutoxy anthracene, 9,10-diethoxy anthracene, 9,10-dipropoxy anthracene, 9,10-bis(2-ethylhexyloxy)anthracene, and other anthracene sensitizers; as well as 2,4-diethyl thioxanthone, 2-isopropyl thioxanthone, 4-isopropyl thioxanthone, and other thioxanthone sensitizers. Representative examples of commercial products include, among others, DBA and DEA (manufactured by Kawasaki Kasei Chemicals) for anthracene sensitizers, and DETX and ITX (manufactured by Lambson) for thioxanthone sensitizers.

Preferably the sensitizer content is in a range of 0 to 8 percent by mass relative to the total mass of photopolymerizable components. A content exceeding 8 percent by mass only represents an excessive addition and is not desirable because the effects will not increase.

<Colorant>

The photocurable inkjet printing ink composition proposed by the present invention may be constituted to contain a colorant of each hue, in order to obtain a photocurable inkjet printing ink composition having each color. Even in cases where it is used as a primer, coloring it will enable confirmation of whether or not a primer layer has been formed.

For such colorants, any pigments or dyes traditionally used in standard photocurable inkjet printing ink compositions may be used without any particular limitations; when lightfastness is considered, however, pigments such as organic pigments and inorganic piments are preferred.

Organic coloring pigments include, for example, dye lake pigments as well as azo-, benzimidazolone-, phthalocyanine-, quinacridone-, anthraquinone-, dioxazine-, indigo-, thioindigo-, perylene-, perinone-, diketopyrrolopyrrole-, isoindolinone-, nitro-, nitroso-, anthraquinone-, flavanthrone-, quinophthalone-, pyranthrone-, indanthrone-based, and other pigments and the like. Inorganic coloring pigments include carbon black, titanium oxide, red iron oxide, graphite, iron black, chrome oxide green, etc.

Also, specific examples of pigments, by each representative hue, for the photocurable inkjet printing ink composition proposed by the present invention, are as follows.

First, yellow pigments for using the present invention as a photocurable yellow ink composition for inkjet printing include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., where preferred choices include C. I. Pigment Yellow 150, 155, 180, 213, etc.

Magenta pigments used as a photocurable magenta ink composition for inkjet printing include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., where preferred choices include C. I. Pigment Red 122, 202, C. I. Pigment Violet 19, etc.

Cyan pigments used as a photocurable cyan ink composition for inkjet printing include, for example, C. I. Pigment Blue 1, 2, 3, 15, 15:1, 15:2, 15:3, 15:4, 15:6, 16, 18, 22, 27, 29, 60, etc., where preferred choices include C. I. Pigment Blue 15:4, etc.

Black pigments used as a photocurable black ink composition for inkjet printing include, for example, carbon black (C. I. Pigment Black 7), etc.

White pigments used as a photocurable white ink composition for inkjet printing include, for example, titanium oxide, aluminum oxide, etc., where preferred choices include titanium oxides whose surface has been treated with alumina, silica, and various other materials.

Preferably the colorant content in the photocurable inkjet printing ink composition proposed by the present invention is 1 to 20 percent by mass relative to the total quantity of photocurable inkjet printing ink composition. If the colorant content is less than 1 percent by mass, image quality of the obtained printed matter tends to drop. If the content exceeds 20 percent by mass, on the other hand, viscosity properties of the photocurable inkjet printing ink composition tend to be negatively affected.

<Inorganic Grain Dispersant>

Also, the photocurable inkjet printing ink composition proposed by the present invention may contain, as necessary, an inorganic grain dispersant which is a dispersant for inorganic grains.

An inorganic grain dispersant is used to improve the dispersibility of inorganic grains and preservation stability of the ink composition proposed by the present invention, and although any of traditionally used pigment dispersants may be used without any particular limitation, among these dispersants, use of a polymeric dispersant is preferred. Such inorganic grain dispersants include carbodiimide dispersants, polyester amine dispersants, aliphatic amine dispersants, modified polyacrylate dispersants, modified polyurethane dispersants, multi-chain polymeric nonionic dispersants, polymeric ionic activators, and the like. Any of these inorganic grain dispersants may be used alone, or two or more types may be combined.

Preferably the aforementioned inorganic grain dispersant is contained by 1 to 200 parts by mass when the total quantity of pigment used represents 100 parts by mass. If the content of inorganic grain dispersant is less than 1 part by mass, dispersibility of inorganic grains, and storage stability of the ink composition proposed by the present invention, may drop. On the other hand, adjusting the content to exceed 200 parts by mass, although possible, may not lead to any difference in the effects. A more preferable lower limit, and a more preferable upper limit, of the content of inorganic grain dispersant, are 5 parts by mass and 60 parts by mass, respectively.

<Surface Active Agent>

Preferably the photocurable inkjet printing ink composition proposed by the present invention contains, according to the inkjet head to be used, a silicone surface-active agent or other surface-active agent which is traditionally used in photocurable inkjet printing ink compositions as a surface-active agent, in order to improve discharge stability.

Specific examples of silicone surface-active agents include polyether-modified silicone oil, polyester-modified polydimethyl siloxane, polyester-modified methyl alkyl polysiloxane (product name: BYK-315N, manufactured by BYK-Chemie), and the like. Any of these may be used alone, or two or more types may be combined.

Preferably the content of surface-active agent in the ink composition proposed by the present invention is 0.005 to 1.0 percent by mass. If the content is less than 0.005 percent by mass, the surface tension of the photocurable inkjet printing ink composition proposed by the present invention will increase, and therefore stability of its discharge from the inkjet head will drop. If the content exceeds 1.0 percent by mass, on the other hand, more bubbles will generate in the photocurable inkjet printing ink composition and its discharge stability will drop as a result.

<Additives>

Various additives may be added to the photocurable inkjet printing ink composition proposed by the present invention, as necessary, to manifest various functionalities. Specific examples include photostabilizers, surface treatment agents, antioxidants, antiaging agents, crosslinking promoters, quinones and other polymerization inhibitors, dioctyl maleate and other plasticizers, preservatives, pH-adjusting agents, defoaming agents, moisturizing agents, etc.

Also, while the photocurable inkjet printing ink composition proposed by the present invention may contain a solvent, preferably it is solvent-free and, if solvent-free, preferably it has a viscosity at 25° C. of 100 cps or lower, or more preferably 20 cps or lower, or yet more preferably 10 cps or lower. Furthermore, the specific viscosity of the photocurable inkjet printing ink composition may be designed adaptable to each inkjet device.

It should be noted that, in this Specification, "viscosity" refers to the viscosity measured using a viscometer (product name: RE215L Viscometer, manufactured by Toki Sangyo) under the measurement conditions of 25° C. and 5 to 100 rpm.

The photocurable inkjet printing ink composition proposed by the present invention, when it contains the specific quantities of the specific photopolymerizable components and acylphosphine oxide photopolymerization initiator or thioxanthone photopolymerization initiator as mentioned above, can offer excellent curability under ultraviolet light, particularly ultraviolet light from light-emitting diode (LED) light sources, good adhesion to base materials made of polypropylene and other polyolefin materials and also to metals, excellent discharge stability and storage stability, as well as excellent safety in all aspects as demonstrated by high flash point, low skin irritability, and low odor.

The method for preparing the ink composition proposed by the present invention is not limited in any way, and it may be prepared by adding all of the aforementioned materials and mixing them in a bead mill, 3-roller mill, etc.

It should be noted that the ink composition proposed by the present invention may also be prepared by mixing the pigment, pigment dispersant, and photopolymerizable components to obtain a concentrated base ink composition beforehand, and then adding the photopolymerizable components, photopolymerization initiator, and, if necessary, surface-active agent and other additives to this concentrated base ink composition so as to achieve a desired makeup of photocurable inkjet printing ink composition.

The methods for using the ink composition proposed by the present invention specifically include one whereby the ink composition proposed by the present invention is discharged onto a metal base material (hereinafter simply referred to as "base material") from an inkjet head, after which the coating film of the ink composition proposed by the present invention that has impacted on the base material is exposed to light and thus cured.

For example, the ink composition proposed by the present invention may be discharged onto the base material (printing of images) by means of supplying it to a low-viscosity printer head of an inkjet recording printer and discharging the ink composition from the printer head so that the thickness of the coating film on the base material becomes 1 to 60 μm, for example. Also, the ink composition proposed by the present invention may be exposed to light and thus cured (curing of images) by means of irradiating light onto the coating film of the ink composition that has been applied, as images, to the base material.

For the inkjet recording printer device with which to print the ink composition proposed by the present invention, any traditionally-used inkjet recording printer device may be utilized. It should be noted, however, that, if a continuous-type inkjet recording printer device is used, a conductivity-adding agent is further added to the ink composition proposed by the present invention to adjust the conductivity level.

The light source used in the aforementioned curing of the coating film may be ultraviolet light (UV), ultraviolet light (light-emitting diode (LED)), electron beams, visible light, etc., of which a light-emitting diode (LED) that generates ultraviolet light whose emission peak wavelength is in a range of 350 to 420 nm is environmentally preferred.

When printed and photocured on the surface of a base material, the photocurable inkjet printing ink composition proposed by the present invention provides a printing layer for printing certain information; however, since the surface of the cured layer exhibits excellent adhesion also to general ink compositions, it may also be formed, on the surface of a metal molding, as a primer layer for printing using general inks.

Additionally, when the ink composition proposed by the present invention is used for forming a primer layer, any general ink composition, including a photocurable or non-photocurable ink composition, may be selected and used for the ink layer to be formed thereon.

EXAMPLES

Examples 1 to 5 and Comparative Examples 1 to 4

Preparation of Photocurable Inkjet Printing Ink Composition

The present invention is explained in greater detail below using examples; however, the present invention is not limited to these examples. It should be noted that, unless otherwise specified, "%" means "percent by mass," while "part(s)" means "part(s) by mass."

The materials used in the Examples and Comparative Examples below are as follows.

Alumina: Dispersion liquid (average grain size 80 nm) obtained by dispersing, using 0.2-mm zirconia beads and a bead mill, a mixture of 10 parts of AEROXIDE ALU-C (manufactured by Nippon Aerosil), 1 part of AJISPER PB821 (manufactured by Ajinomoto Fine-Techno), and 89 parts of benzyl acrylate.

CN371NS: Amine-modified acrylate oligomer (amino group-containing multifunctional monomer) (manufactured by Sartomer)

SR454: Ethoxylated trimethylol propane triacrylate (manufactured by Sartomer)

CD9050: Acid-modified acrylic monomer having a structure where some hydroxyl groups of a polyol are ester-bonded with a (meth)acrylic acid while other hydroxyl groups are ester-bonded with a phosphoric acid (manufactured by Sartomer)

CD9051: Acid-modified acrylic monomer having a structure where some hydroxyl groups of a polyol are ester-bonded with a (meth)acrylic acid while other hydroxyl groups are ester-bonded with a phosphoric acid (manufactured by Sartomer)

SK resin: Variplus SK (aromatic ketone-formaldehyde condensation type hydrogenated ketone, manufactured by Tego) diluted with benzyl acrylate, solid content 40 percent by mass TPO: 2,4,6-trimethyl benzoyl-diphenyl-phosphine oxide DETX: 2,4-diethyl thioxanthone UV5: Photostabilizer UV22: Photostabilizer BYK-315N: Polyester-modified polymethyl alkyl siloxane surface-active agent, solid content 25 percent by mass; solvent component is a mixture of methoxy propyl acetate and phenoxy ethanol at a mass ratio of 1:1

[Adhesion to Aluminum]

Each of the photocurable inkjet printing ink compositions obtained in Examples 1 to 5 and Comparative Examples 1 to 4 was used to perform inkjet printing on an aluminum film.

The obtained printed area was checked for adhesion using the following method.

A piece of a cellophane tape manufactured by Nichiban was adhered and then peeled, and the degree of peeling of the hardened ink film surface was visually evaluated.

O: Peeling does not occur.

X: The coating film peels at least partially.

[Heat Resistance of Coating Film]

Each of the photocurable inkjet printing ink compositions obtained in Examples 1 to 5 and Comparative Examples 1 to 4 was used to perform inkjet printing on an aluminum film.

The obtained aluminum film with coating film was kept for one day at 60° C., after which the condition of the coating film was observed.

O: The coating film remains adhered to the aluminum film surface, just like immediately after printing.

X: The coating film peels from the aluminum film surface, or peels easily when touched with a finger.

TABLE 1

|  | Examples | | | | | Comparative Examples | | | |
| --- | --- | --- | --- | --- | --- | --- | --- | --- | --- |
|  | 1 | 2 | 3 | 4 | 5 | 1 | 2 | 3 | 4 |
| Alumina | 3.0 | 3.0 | 3.0 | 3.0 | 3.0 | 3.0 | 3.0 | 3.0 | 3.0 |
| Benzyl acrylate | 56.6 | 56.6 | 47.6 | 49.6 | 51.6 | 71.6 | 16.6 | 36.6 | 57.1 |
| CN371NS | 4.0 | 4.0 | 3.0 | 6.0 | 4.0 | 4.0 | 4.0 | 4.0 | 4.0 |
| SR454 |  |  |  |  | 5.0 |  |  | 20.0 |  |
| Acryloyl morpholine | 15.0 | 15.0 | 25.0 | 20.0 | 15.0 |  | 55.0 | 15.0 | 15.0 |
| CD9050 |  | 0.5 |  |  | 0.5 |  |  | 0.5 |  |
| CD9051 | 0.5 |  | 0.5 | 0.5 |  | 0.5 | 0.5 |  |  |
| SK resin | 6 | 6 | 6 | 6 | 6 | 6 | 6 | 6 | 6 |
| TPO | 12 | 12 | 12 | 12 | 12 | 12 | 12 | 12 | 12 |
| IRGACURE 719 | 0 | 0 | 0 | 0 | 0 | 0 | 0 | 0 | 0 |
| DETX | 0 | 0 | 0 | 0 | 0 | 0 | 0 | 0 | 0 |
| UV5 | 1.9 | 1.9 | 1.9 | 1.9 | 1.9 | 1.9 | 1.9 | 1.9 | 1.9 |
| UV22 | 0.5 | 0.5 | 0.5 | 0.5 | 0.5 | 0.5 | 0.5 | 0.5 | 0.5 |
| BYK-315N | 0.5 | 0.5 | 0.5 | 0.5 | 0.5 | 0.5 | 0.5 | 0.5 | 0.5 |
| Total | 100 | 100 | 100 | 100 | 100 | 100 | 100 | 100 | 100 |
| Adhesion to aluminum | ○ | ○ | ○ | ○ | ○ | ○ | X | X | X |
| Heat resistance of coating film (60° C., 1 d) | ○ | ○ | ○ | ○ | ○ | X | ○ | ○ | ○ |

Based on the results shown in Table 1 above, the ink composition proposed by the present invention exhibits excellent adhesion to aluminum as well as good heat resistance of the coating film, as evident from Examples 1 to 5 representing photocurable inkjet printing ink composition conforming to the present invention. However, Comparative Example 1 where no monofunctional monomer with a Tg of 100° C. or above was contained, and Comparative Example 3 where the monofunctional monomer did not account for at least 80 percent by mass of all monomers resulted in poor heat resistance of the coating film. Furthermore, Comparative Example 2 where a monofunctional monomer with a Tg of 100° C. or above was contained excessively, and Comparative Example 4 where no acid-modified acrylic monomer was contained, resulted in poor adhesion to the aluminum film.

According to these results, the present invention, representing a photocurable inkjet printing ink composition of a specific makeup, provides balanced effects of sufficient adhesion to aluminum and other surfaces and of excellent heat resistance of the coating film.

What is claimed is:

1. A photocurable inkjet printing ink composition, containing, relative to an entire ink composition:
   0.1 percent by mass or more of an acid-modified acrylic monomer; and
   10 to 30 percent by mass of Ra monofunctional monomer(s) each having a Tg (glass transition temperature) of 100° C. or above;
   wherein all monofunctional monomer(s), including the all monofunctional monomer(s) each having a Tg of 100° C. or above, account(s) for 80 percent by mass or more of all monomer(s) contained in the entire ink composition, and
   the all monofunctional monomer(s) each having a Tg of 100° C. or above is/are one or more monofunctional monomers selected from the group consisting of acryloyl morpholine, methyl methacrylate, acrylamide, acrylic acid, dicyclopentanyl methacrylate, and 1-adamantyl methacrylate.

2. The photocurable inkjet printing ink composition according to claim 1, wherein each monofunctional monomer with a Tg of 100° C. or above is a monofunctional monomer with a Tg of 120° C. or above.

* * * * *

UNITED STATES PATENT AND TRADEMARK OFFICE
CERTIFICATE OF CORRECTION

| | |
|---|---|
| PATENT NO. | : 11,053,399 B2 |
| APPLICATION NO. | : 16/629949 |
| DATED | : July 6, 2021 |
| INVENTOR(S) | : Yoichi Sato, Okinori Nakashima and Takuya Myose |

It is certified that error appears in the above-identified patent and that said Letters Patent is hereby corrected as shown below:

In the Claims

At Column 10, Line 27, in Claim 1, the letters "Ra" before "monofunctional" should be replaced with --all--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*